(12) United States Patent
Chow et al.

(10) Patent No.: US 11,406,907 B2
(45) Date of Patent: Aug. 9, 2022

(54) PLAYER FEEDBACK TO INCREASE SPECTATORSHIP IN A VIDEO GAME

(71) Applicant: Sony Interactive Entertainment Inc., Tokyo (JP)

(72) Inventors: Katrine Chow, San Mateo, CA (US); Saket Kumar, San Mateo, CA (US); Steven Osman, San Francisco, CA (US); Yuichiro Nakamura, San Mateo, CA (US); Xavier Menendez-Pidal, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/836,148

(22) Filed: Mar. 31, 2020

(65) Prior Publication Data

US 2021/0299580 A1  Sep. 30, 2021

(51) Int. Cl.
*A63F 13/86* (2014.01)
*A63F 13/335* (2014.01)
*A63F 13/79* (2014.01)

(52) U.S. Cl.
CPC ............ *A63F 13/86* (2014.09); *A63F 13/335* (2014.09); *A63F 13/79* (2014.09); *A63F 2300/5546* (2013.01); *A63F 2300/577* (2013.01)

(58) Field of Classification Search
None
See application file for complete search history.

(56) References Cited

U.S. PATENT DOCUMENTS

| | | | | |
|---|---|---|---|---|
| 8,628,424 | B1 * | 1/2014 | Kern | A63F 13/798 463/42 |
| 10,105,608 | B1 * | 10/2018 | George | A63F 13/86 |
| 10,300,394 | B1 * | 5/2019 | Evans | G06F 3/048 |
| 2003/0220143 | A1 * | 11/2003 | Shteyn | A63F 13/792 463/42 |
| 2007/0117635 | A1 * | 5/2007 | Spanton | A63F 13/12 463/43 |
| 2011/0281648 | A1 | 11/2011 | Weising | |
| 2011/0295666 | A1 * | 12/2011 | Musial | G06Q 30/0224 705/14.12 |
| 2018/0093185 | A1 | 4/2018 | Black et al. | |
| 2020/0094149 | A1 * | 3/2020 | Gonzales, II | H04N 21/2187 |
| 2020/0195988 | A1 * | 6/2020 | Zavesky | H04N 21/4781 |
| 2021/0001224 | A1 | 1/2021 | Weising | |

OTHER PUBLICATIONS

PCT/US2021023971, Notification of Transmittal of the International Search Report and the Written Opinion of the International Searching Authority, or the Declaration, PCT/ISA/220, and the International Search Report, PCT/ISA/210, dated Jul. 8, 2021.

\* cited by examiner

*Primary Examiner* — Jason T Yen
(74) *Attorney, Agent, or Firm* — Penilla IP, APC

(57) ABSTRACT

A method is provided, including the following operations: analyzing gameplay data and spectator data from previous sessions of a video game, wherein the analyzing is configured to correlate a spectator preference to a gameplay condition of the video game; using the correlated spectator preference to generate an in-game recommendation for the gameplay condition; identifying the gameplay condition occurring in a current session of the video game; responsive to identifying the gameplay condition occurring in the current session, then presenting the in-game recommendations to a player of the current session of the video game.

14 Claims, 9 Drawing Sheets

PLAYER FEEDBACK TO INCREASE SPECTATORSHIP IN A VIDEO GAME

BACKGROUND

Field of the Disclosure

The present disclosure relates to systems and methods for providing player feedback to increase spectatorship in a video game.

Description of the Related Art

An expanding area of the gaming industry is that of sharing gameplay video and spectating gameplay. Users are now able to record and share their gameplay through websites, social media, etc. Furthermore, users may live-stream their gameplay, so that others can view their gameplay as it occurs in substantial real-time.

Another current trend in the gaming industry is a move towards cloud gaming. Cloud gaming provides advantages to the end user by enabling remote execution of a video game in a data center where the resources for the video game can be guaranteed. The video generated by the remotely executed video game is streamed to the user's equipment, and inputs from the user are sent back to the data center. This frees the end user from the need to own specific hardware in order to execute the game itself. Rather, the end user need only possess sufficient hardware to stream the gameplay, and may still enjoy a high quality gaming experience. Furthermore, in theory, cloud gaming enables gaming from any location where network connectivity is available.

A continuing trend in the video game industry is the increased sophistication of graphics and the availability of computing resources to meet the demands of modern game engines. As video games evolve, their resolutions and frame rates continue to increase, enabling rendering of very realistic and detailed virtual environments. Additionally, the popularity of cloud gaming continues to grow, and the shift to cloud executed video games enables even greater access to high quality gaming experiences.

It is within this context that embodiments of the disclosure arise.

SUMMARY OF THE DISCLOSURE

Implementations of the present disclosure provide systems and methods for providing player feedback to increase spectatorship in a video game.

In some implementations, a method is provided, including the following operations: analyzing gameplay data and spectator data from previous sessions of a video game, wherein the analyzing is configured to correlate a spectator preference to a gameplay condition of the video game; using the correlated spectator preference to generate an in-game recommendation for the gameplay condition; identifying the gameplay condition occurring in a current session of the video game; responsive to identifying the gameplay condition occurring in the current session, then presenting the in-game recommendations to a player of the current session of the video game.

In some implementations, correlating the spectator preference to the gameplay condition is configured to identify a player activity that increases or maximizes a number of spectators during the gameplay condition, and wherein the in-game recommendation is configured to recommend to the player of the current session to perform the player activity that increases or maximizes the number of spectators during the gameplay condition.

In some implementations, correlating the spectator preference to the gameplay condition is configured to identify a player activity that increases or maximizes spectator engagement during the gameplay condition, and wherein the in-game recommendation is configured to recommend to the player of the current session to perform the player activity that increases or maximizes spectator engagement during the gameplay condition.

In some implementations, spectator engagement is defined from one or more of comments, likes, shares.

In some implementations, the gameplay condition of the video game is defined by one or more of a time of day, a location in a virtual environment of the video game, a level or stage of the video game.

In some implementations, the gameplay data includes one or more of gameplay event data, player inputs, player location data.

In some implementations, the spectator data includes one or more of numbers of spectators, comments, spectator profile data.

In some implementations, a method is provided, including the following method operations: analyzing one or more characteristics of spectators of a session of a video game to identify one or more prevalent features of the spectators; based on the prevalent features of the spectators, generating one or more recommendations for a player of the session of the video game; presenting the one or more recommendations to the player during the session of the video game.

In some implementations, the characteristics of the spectators include one or more of age, gender, geographic location, nationality, language, gameplay history.

In some implementations, the one or more recommendations are configured to recommend to the player to perform an activity that increases spectator engagement.

In some implementations, analyzing the characteristics of the spectators is configured to identify one or more clusters of values for a given characteristic of the spectators.

In some implementations, analyzing the characteristics of the spectators is configured to identify a mean, median, or mode for a given characteristic of the spectators.

In some implementations, the method further includes: analyzing previous sessions of the video game to determine one or more spectator preferences based on the one or more characteristics; wherein the one or more recommendations are configured to recommend to the player to perform an activity in accordance with the spectator preferences.

In some implementations, a non-transitory computer readable medium is provided having program instructions embodied thereon that, when executed by at least one computing device, cause said at least one computing device to perform a method comprising the following method operations: analyzing gameplay data and spectator data from previous sessions of a video game, wherein the analyzing is configured to correlate a spectator preference to a gameplay condition of the video game; using the correlated spectator preference to generate an in-game recommendation for the gameplay condition; identifying the gameplay condition occurring in a current session of the video game; responsive to identifying the gameplay condition occurring in the current session, then presenting the in-game recommendations to a player of the current session of the video game.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Figure 1:
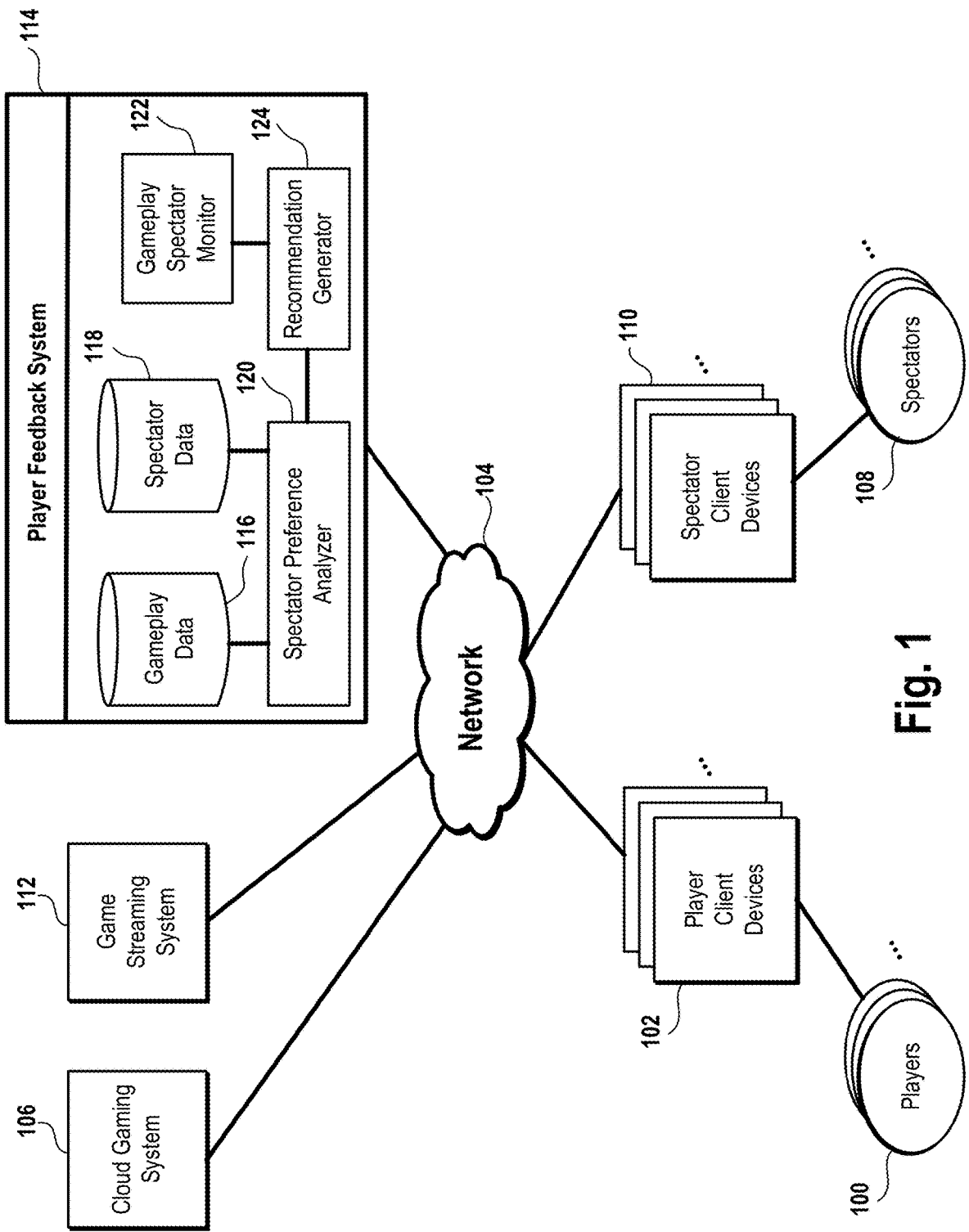
FIG. 1 conceptually illustrates a system for providing feedback to players of a video game based on spectator preferences, in accordance with implementations of the disclosure.

FIG. 1 conceptually illustrates a system for providing feedback to players of a video game based on spectator preferences, in accordance with implementations of the disclosure. In the illustrative implementation, players 100 engage in gameplay of a video game using player client devices 102. By way of example without limitation, the player client devices 102 can be one or more of a game console, a personal computer, a laptop, a tablet, a cellular phone, a mobile device, or any other computing device through which a user can access and engage in gameplay of a video game. In some implementations, player client devices 102 can include a display upon which gameplay video is rendered, whereas in other implementations, player client devices 102 can be connected to display devices such as televisions, LCD displays, monitors, projectors, etc. In some implementations, the video game is executed by the player client devices 102. Whereas in other implementations, the video game is executed by a cloud gaming system 106, with gameplay being streamed over a network 104. In some implementations, the cloud gaming system 106 includes one or more cloud gaming machines which execute the video game and generate gameplay video that is streamed over the network 104 to player client devices 102. Inputs generated by the players 100, such as through the operation of controller devices or other interface devices, are transmitted from the player client devices 102 over the network 104 to the cloud gaming system 106, where such inputs are applied to the executing video game to drive gameplay.

As gameplay of the video game occurs, spectators 108 are able to spectate the gaming sessions using spectator client devices 110. The spectator client devices 110 can be similar devices to the player client devices 102 described above. To enable spectating of game sessions of the video game, in some implementations a game streaming system 112 is implemented over network 104. Broadly speaking, the game streaming system 112 receives gameplay video from either player client devices 102 or cloud gaming system 106, depending upon which is executing the video game in the particular implementation, and distributes the gameplay video over the network 104 to the spectator client devices 110, for viewing by the spectators 108.

A player feedback system 114 is implemented to provide feedback to the players 100 based on spectator preferences, and so that players may increase their popularity, grow their spectatorship, and improve their activity and gameplay to increase spectator engagement. As various gameplay sessions of the video game occur, gameplay data 116 and spectator data 118 are collected and stored. The gameplay data 116 broadly includes data that pertains to, or describes, the gameplay of a particular session of the video game. By way of example without limitation, the gameplay data 116 can include one or more of gameplay events, player inputs/actions, player locations/movements in a virtual space/environment of the video game, etc. The spectator data 118 broadly includes data pertaining to or describing characteristics/attributes of spectators of the game sessions. By way of example without limitation, the spectator data 118 can include one or more of numbers of spectators of the game sessions (tracked over time), spectator comments for a given game session, spectator emotion/sentiment (e.g. detected through analysis of video of spectators, language, biometric sensors, etc.), spectator age, gender, geographic location, primary language, secondary language, income level, game experience level, games owned, games played, spectator client device type/hardware, etc.

A spectator preference analyzer 120 is configured to analyze the gameplay data 116 and the spectator data 118 to determine spectator preferences with regard to gameplay of the video game. In other words, the spectator preference analyzer 120 determines what is popular with spectators, what is likely to lead to increased numbers of spectators, what is likely to produce increased spectator engagement, what is preferred or enjoyed by spectators, etc.

In some implementations, the spectator preference analyzer 120 identifies correlations between indicators of spectator popularity/preference and types of gameplay activity. For example, indicators of spectator popularity can include the number of spectators over time, comments by spectators which can be semantically analyzed for sentiment, sharing by spectators (such as to a social network), subscribes, spending or sponsorships (e.g. how many people make purchases of the game, purchases of content of the game, make gifts to the player being spectated, join the player's crowdfunding page (e.g. Patreon page), etc.). These indicators can be correlated to gameplay activity to determine what types of gameplay activity are popular with spectators. Some non-limiting examples include the following: determining what types of gameplay actions or events are popular, determining where in a virtual environment or game arena such types of gameplay actions or events are popular, determining when particular gameplay actions or events are popular, determining what gameplay styles are popular, determining what regions of a virtual environment or game arena are popular for spectating, determining what levels or stages of the video game are popular for spectating, determining what attributes of player characters or other player controlled entities (e.g. vehicles, weapons, groups of characters, etc.) are popular, determining what virtual objects are popular, determining skills/moves that are popular, etc.

Furthermore, the specific characteristics or attributes of the spectators can be taken into account so as to determine preferences of the spectators according to the type or characteristics of the spectators. For example any of the above described gameplay activity can be correlated to spectator attributes so as to understand which types of gameplay activity (and when such types of gameplay activity) are preferred by, or popular with, which types of spectators. By way of example without limitation, this can include determining spectator preferences with regards to gameplay based on spectator age, geographic location, gender, or any other spectator characteristic.

It will be appreciated that the understanding of popular gameplay activity that is determined by the spectator preference analyzer 120 can be applied to provide feedback to players of the video game to assist them in growing their spectatorship, such as by increasing the number of spectators or increasing spectator engagement. To achieve this, a gameplay/spectator monitor 122 is implemented to monitor gameplay activity occurring in a current game session and further monitor the spectators of said game session. It will be appreciated that this monitoring occurs in real-time as the game session is being executed. Then based on the characteristics of the game play and the characteristics of the spectators of the game play, a recommendation generator 124 uses the previously determined spectator preferences to provide feedback to the player of the current game session. Such feedback is configured to encourage the player of the current game session to take actions or gameplay activity that correlates to increased spectatorship. In this manner, the player of the video game can take steps to increase their popularity with spectators. In various implementations, the feedback to the player can be provided in various forms, such as messages/notifications which are displayed or vocalized in-game to the player, haptic feedback, etc.

In some implementations, the system is further configured to implement a feedback loop as a whole. More specifically, the effects of the player feedback advising the player on what to do can be tracked and measured. This measurement can include determining to what extent the player is heeding the advice and performing the recommended activity, and also determining whether, and by how much, the recommended activity is improving the player's spectatorship. In some implementations, if the player consistently ignores the advised activity, or follows the advice at a very low rate, then the amount or frequency of player feedback provided can be reduced. Conversely, if the player consistently follows the feedback, then its amount/frequency may be increased. In some implementations if the recommended activity is determined to be highly effective in increasing spectatorship, then the player feedback is provided in greater amounts/frequency; whereas if the recommended activity is determined to be not very effective in increasing spectatorship, then the player feedback is provided in lesser amounts/frequency.

In some implementations, depending upon the determined effectiveness of recommended activities, then a threshold strength of correlation between player activity and spectatorship in the historical analysis that is used to determine what activities to recommend to the player, may be increased or decreased. For example, if one or more recommended activities are determined to have low effectiveness in increasing spectatorship, then the threshold strength of correlation required for recommendation of such activities may be increased, so that it is more likely that when such activities are recommended, they will increase spectatorship when followed.

Figure 2:
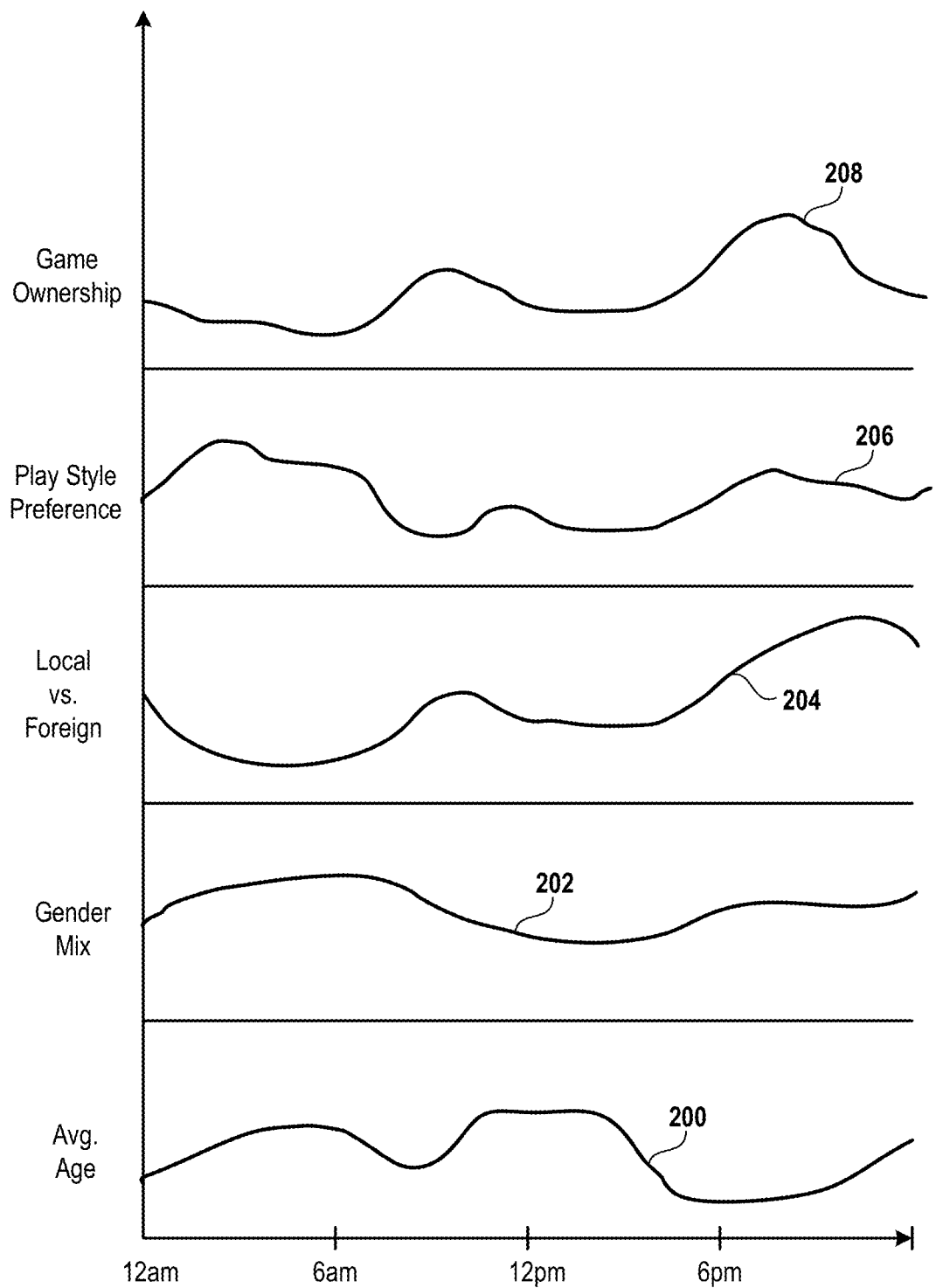
FIG. 2 is a chart conceptually illustrating various spectator attributes or characteristics over time during the course of a day, in accordance with implementations of the disclosure.

FIG. 2 is a chart conceptually illustrating various spectator attributes or characteristics over time during the course of a day, in accordance with implementations of the disclosure. It will be appreciated that the type of spectator that is watching a video game will change depending upon the time of day. And based on this, feedback can be given to the player that encourages them to perform gameplay activity that is preferred by the given type of spectator that is currently spectating their game session.

By way of example, the curve 200 illustrates the average age of spectators of a video game session during the course of a day. In some implementations, instead of the average age, the curve 200 represents the median age of spectators or another measure of the prevalence of ages of the spectators. Using this information, player feedback can be provided based on the time of day to encourage the player to perform gameplay actions or other activity that is preferred by spectators of the average age or prevalent age group. For example, at 12 noon when the average age of spectators is high, the player can be encouraged to play in a particular style preferred by older spectators, whereas at 6 p.m. when the average age of spectators is low, then the player is encouraged to play in a different style preferred by younger spectators. In some implementations, the player can be encouraged to take age-appropriate actions, such as avoiding explicit language when their spectators are predominantly younger.

As another example, the curve 202 conceptually illustrates the gender mix over time during the course of a day. In some implementations, the gender mix is defined as the ratio of males to females among spectators. By way of example, it might be discovered that female spectators prefer more cooperative gameplay whereas male spectators prefer more individualistic gameplay. Therefore, at times when there are increased numbers of female spectators, the player could be encouraged to engage in more cooperative gameplay that is preferred by the female spectators (relative to male), whereas at other times when there are increased numbers of male spectators (relative to female), then the player could be encouraged to engage in more individualistic gameplay that is preferred by the male spectators. While cooperative versus individualistic gameplay preference is used as an example, it will be appreciated that any other preference differentiation between males and females can be applied.

In another example, the curve 204 conceptually illustrates the relative amounts of local spectators versus foreign spectators, occurring over time during the course of the day. In some implementations, the local and foreign spectators can be defined based on the geographic locations of the spectators (e.g. using an IP address or other indicator of geographic location). For example, a local spectator may be a spectator that is located within the same country or region as the player, whereas a foreign spectator is one that is located outside of the player's country or region. Feedback can be provided to the player based on the geographic distribution of the spectators. For example, at 4 a.m. when there are more foreign spectators versus local spectators, then the player might be encouraged not to speak as much in their local language, or be encouraged to speak in a different language that is more likely to be understood by the foreign spectators. For example, if the player is in an English speaking country then they might be encouraged not to speak as much English but instead to use non-language sounds or gestures or other forms of communication. Extending the concept, it may be determined that there are increased amounts of spectators from particular regions, such as Spanish-speaking countries, at certain times of day, and during such times the player can be encouraged to use more Spanish as opposed to English.

In another example, the curve 206 conceptually illustrates a gameplay style preference changing over time during the course of a day. In some implementations, such a curve can represent relative preference for one style of gameplay versus another style of gameplay (e.g. cooperative versus individualistic/competitive, aggressive versus less-aggressive/passive, openness versus stealth, using more flair versus using less flair, etc.). For example, at 1 p.m. the player may be encouraged to play the video game using a certain gameplay style preferred by the majority of spectators at that time, whereas at 2 a.m. the player is encouraged to play the video game using a different gameplay style that is preferred by the spectators at that time.

As another example, the curve 208 conceptually illustrates game ownership of a video game by spectators over time during the course of a day. In some implementations, the curve identifies the proportion of spectators that own the video game. For example, it may be determined that around 6 pm a higher proportion of spectators own the video game, whereas at 6 am, a much lower proportion of spectators own the video game. Accordingly, feedback to the player could be provided to perform activities preferred by owners of the video game at 6 pm, and to perform activities preferred by non-owners of the video game at 6 am. In some implementations, when a higher prevalence of non-owners are spectating, then the player may be encouraged to give more explanation of activity in the gameplay, or slow down their gameplay, or otherwise take actions which would enable spectators who are less familiar with the video game to better appreciate the game session.

Figure 3:
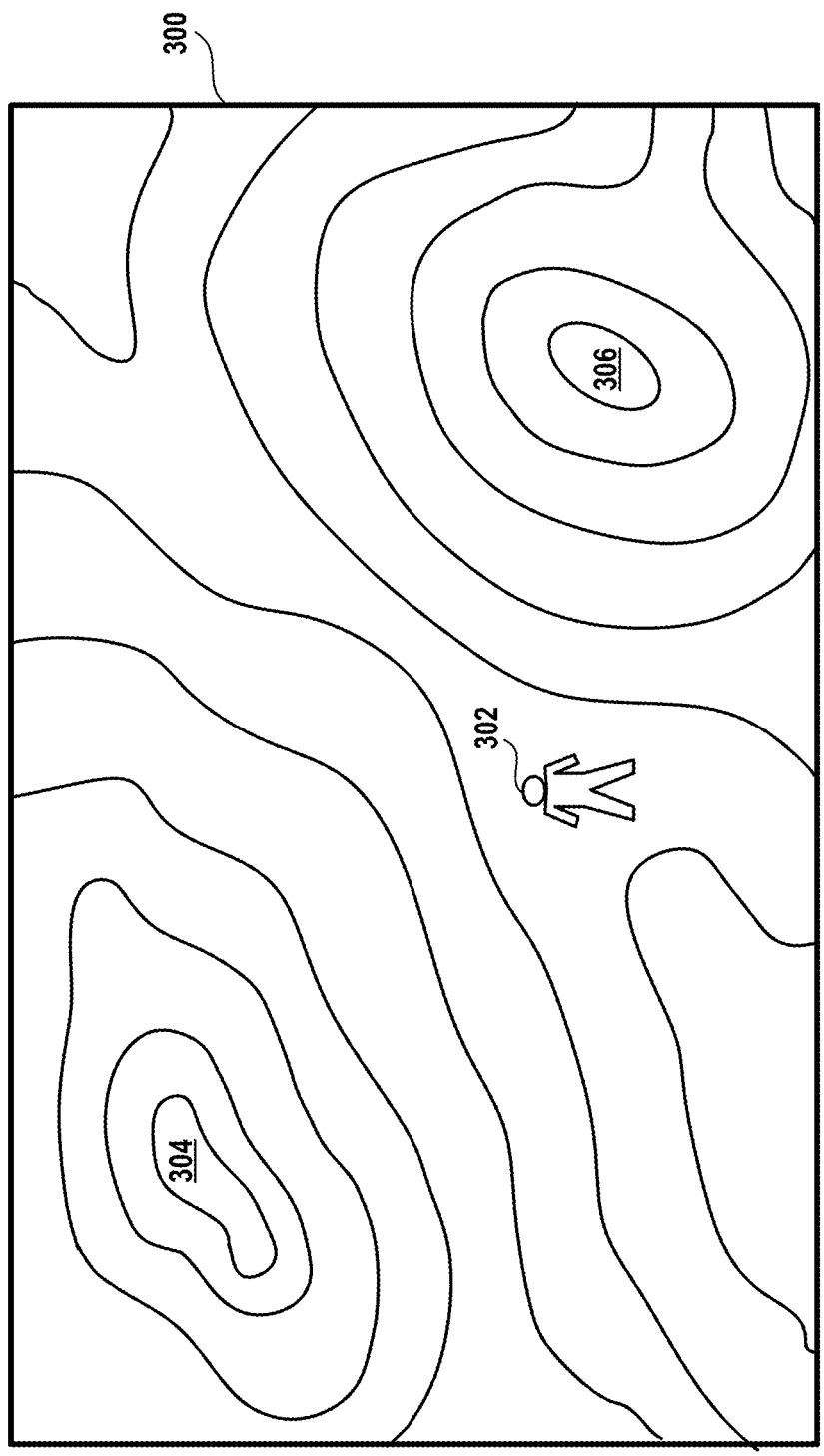
FIG. 3 conceptually illustrates a virtual environment/space in which gameplay of a video game occurs, in accordance with implementations of the disclosure.

FIG. 3 conceptually illustrates a virtual environment/space in which gameplay of a video game occurs, in accordance with implementations of the disclosure. In the illustrated implementation, an overhead view of a virtual environment 300 is shown. In various implementations, the virtual environment 300 can be part of a larger gaming arena, a level or stage of the video game, or other portion of the gaming environment in which gameplay of the video game occurs. In the illustrated view of the virtual environment 300, various isometric lines are depicted. Similar to a topographic map, the isometric lines represent constant values along each line.

In some implementations, spectator preference/popularity for a given activity can be determined as a function of location in the virtual environment 300. And hence, the isometric lines indicate values of a spectator preference for some activity. Thus, for example, the region 304 in the illustrated virtual environment 300 may be a region with a high spectator preference for a given activity, whereas the region 306 is a region with a low spectator preference for the given activity. Accordingly, when a player character 302 in the virtual environment 300 is located at or proximate to the region 304, then the player is encouraged to perform the activity for which there is a high spectator preference. Whereas, when the player character 302 is located at or proximate to the region 306, then the player is encouraged not to perform the activity as there is a low spectator preference in this area of the virtual environment 300. It will be appreciated that spectator preference for activities can include preferences for gameplay actions or events, gameplay styles, activities by the player himself/herself, etc.

In some implementations, the isometric lines indicate relative preference of one activity versus another. By way of example without limitation, in one implementation the isometric lines indicate spectator preference for punching moves versus kicking moves. Thus, in the illustrated example, in the region 304 the spectators prefer more punching moves over kicking moves, whereas in the region 306, the spectators prefer more kicking moves over punching moves. Accordingly, the player might be encouraged to move to the region 304 if the player would like to perform more punching moves, or move to the region 306 if the player would like to perform more kicking moves. Similarly, if the player character 302 is situated at or near the region 304, then the player can be informed that spectators prefer more punching moves in this region; but if they would like to perform more kicking moves then they should move to region 306.

In the above-described implementations, spectator preferences have been mapped/correlated to location in a virtual environment of a video game. It will be appreciated that in other implementations, any other types of gameplay or spectator related data can be correlated or mapped to locations in a virtual environment. For example, attributes or characteristics of spectators can be mapped to locations of the virtual environment so as to understand what locations of the virtual environment are popular with which types of spectators. Using this information, a player can be informed that gameplay in a given location or region is popular with a certain type of spectator, or that if they wish to increase their popularity with a certain type of spectator, then they should move to a particular region or location in the virtual environment. In other implementations, game play activity by other players can be Maps or correlated to location in the virtual environment with a video game. Using this information, the player can be informed about what gameplay actions have been popular with other players of the video game. Accordingly, the player can be encouraged to perform different gameplay actions so as to differentiate themselves from other players and thereby distinguish their gameplay and improve their popularity.

Figure 4:
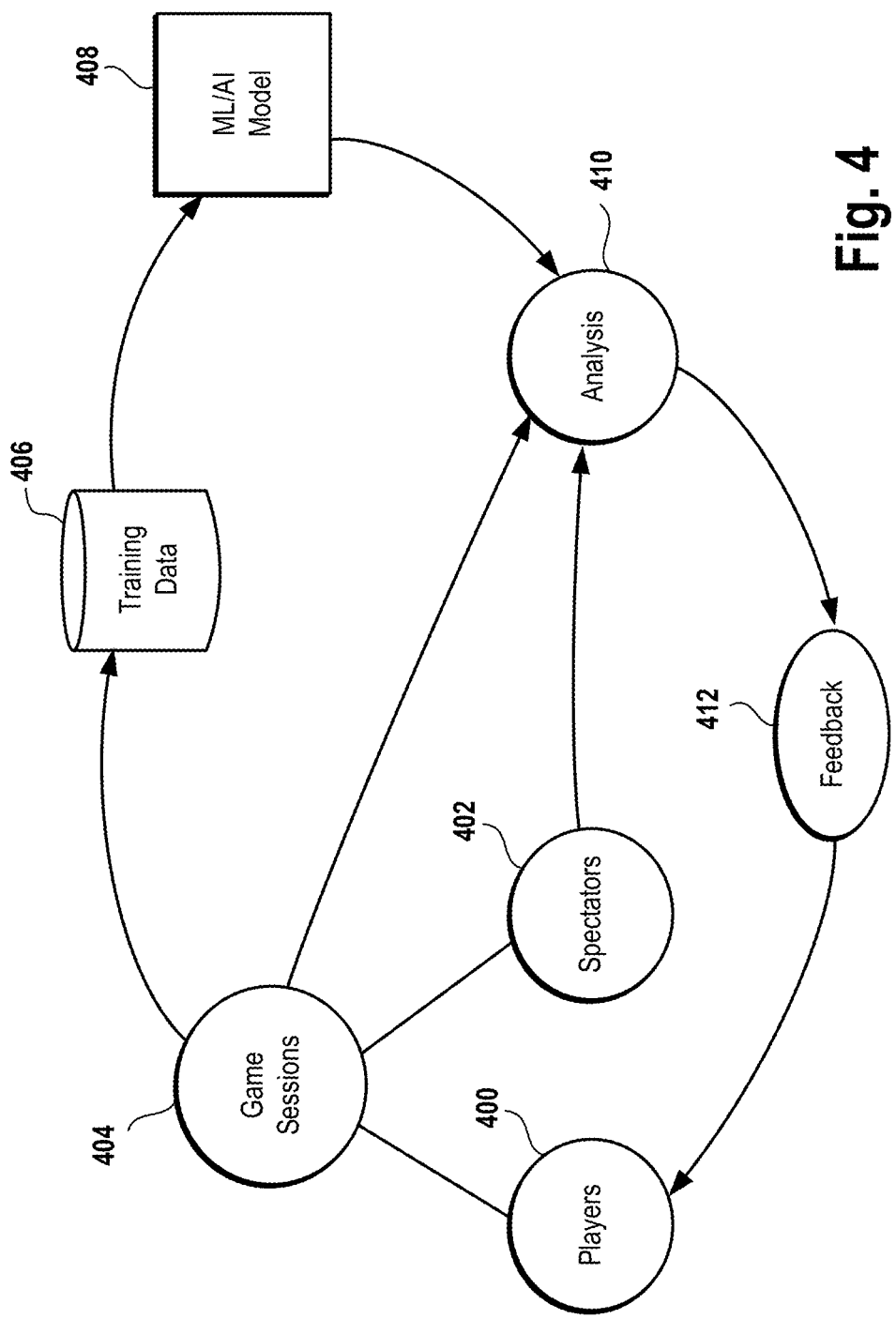
FIG. 4 conceptually illustrates using a machine learning model to provide feedback to a player of a video game to assist the player to increase their popularity, in accordance with implementations of the disclosure.

FIG. 4 conceptually illustrates using a machine learning model to provide feedback to a player of a video game to assist the player to increase their popularity, in accordance with implementations of the disclosure. In the illustrated implementation, players 400 engage in gameplay of a video game through interactivity with executing game sessions 404 of the video game. The gameplay is spectated by spectators 402. Data generated from the gameplay and the spectating activity is stored as training data 406, which can include any of the aforementioned gameplay data and spectator data as described above.

A machine learning (ML) or artificial intelligence (AI) model 408 is trained using the training data 406. In some implementations, the machine learning model 408 is configured to determine classifications of the spectators. The machine learning model 408 can be configured to automatically identify various clusters of spectators, for example based on the characteristics or traits of the spectators and their spectating behavior, such as based on which game sessions they spectate and their reactions during such spectating. The classifications of spectators can be determined along with their preferences with respect to gameplay of a video game. That is, the machine learning model 408 can be trained to identify different types of spectators and the preferred aspects of gameplay of a video game of the different types of spectators.

Using the learned classifications from the machine learning model 408, an analysis process 410 can be carried out during a given game session to, for example, identify what type or types of spectators are spectating the given game session. It will be appreciated that it will often be the case that there are multiple types of spectators in an audience for a given game session, and therefore, in some implementations a predominant class/type of spectators is identified. Based on the type of spectator that is prevalent in the audience, player feedback 412 is provided to the player. For example, such player feedback may indicate to the player what type of spectator is common or prevalent or otherwise observing the gameplay, and may further suggest activity which is preferred by the particular type of spectator that is prevalent.

In some implementations, the machine learning model 408 is trained using the training data 406 to identify what activities are popular amongst spectators under various conditions. For example, the machine learning model 408 can be configured to identify activity on the part of players that is likely to maximize spectatorship, such as in terms of numbers of spectators or spectator engagement. The trained machine learning model 408 can then be applied to an existing game session and based on the current conditions of the gameplay as well as the composition of the spectators, the machine learning model can be applied to predict what sorts of activity on the part of the player is likely to increase spectatorship. This information can be communicated as feedback 412 to the player of the current existing game session, thereby assisting the player in growing they're spectatorship.

It should be appreciated that in typical gameplay of a video game, most players simply seek to achieve the goals or objectives of the video game, such as by achieving the highest score possible, defeating enemies or other players, etc. However, in accordance with implementations of the present disclosure, by providing feedback to players regarding activities or actions they may pursue to grow their spectatorship, this provides a new objective for players to pursue. This enables players to optimize their activities and gameplay to achieve growth in spectatorship, which may or may not coincide with the typical objectives of the video game.

Figure 5:
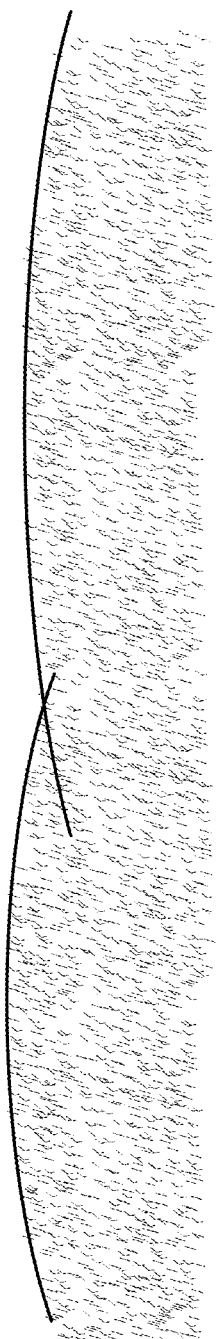
FIG. 5 illustrates a player view of a virtual environment during gameplay of a video game, in accordance with implementations of the disclosure.
Figure 5:
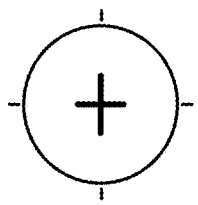
Figure 5:
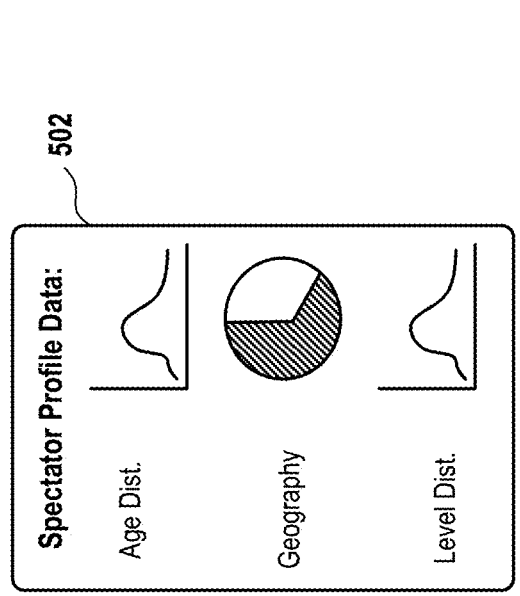
Figure 5:
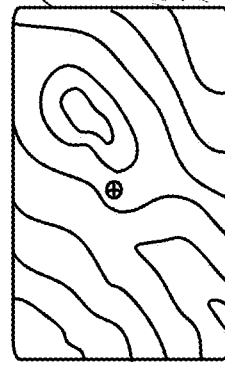

FIG. 5 illustrates a player view of a virtual environment during gameplay of a video game, in accordance with implementations of the disclosure. In the illustrated implementation, the player view 500 is a first-person view of the video game's virtual environment in which gameplay occurs. Feedback to enable the player to optimize their activity and gameplay around spectatorship can be provided through display of various kinds of information in the player view 500.

In some implementations, spectator profile data 502 is surfaced in the player view 500. Broadly speaking, the spectator profile data 502 includes information or data which describes the characteristics or attributes of the spectators that are currently spectating the gameplay. By way of example, such data can include pictorial displays (e.g. graphs, charts, etc.) or textual displays of data describing attributes such as the age distribution of the spectators, the geographic distribution of the spectators, the level/experience distribution of the spectators, etc. By being made aware of the characteristics of the spectators, the player can adjust their gameplay or activity such as speech/gestures, to better suit the current audience.

In some implementations, messages or notifications can be surfaced in the player view 500 to provide guidance to the player regarding activity or information useful for increasing the player's spectatorship/popularity. For example, in the illustrated implementation a message 504 is configured to tell the player to try using more grenades, as it may be determined that based on the characteristics of the spectators or the current location of the player in the video game virtual environment, that spectators prefer the use of grenades versus other actions. As another example, a message 506 is configured to inform the player that if they would like to engage in sniping, then they ought to move to a different location.

In some implementations, a map 508 is rendered in the player view 500, the map 508 being configured to indicate data regarding spectator preferences with respect to the virtual environment in which the gameplay is occurring. For example the map 508 can be configured as a heat map, for example, with colors or isometric lines or other indicators showing locations in the virtual environment that are more popular or less popular with spectators. That is, the map 508 can indicate locations or regions within the virtual environment at which gameplay by the player is more likely or predicted to increase their spectatorship. It will be appreciated that such a heat map can be generated based on characteristics of the spectators as well as characteristics of the player such as the player's style of gameplay. Using such a map 508, the player can move to specific locations in the virtual environment so as to improve their popularity and spectatorship.

Figure 6:
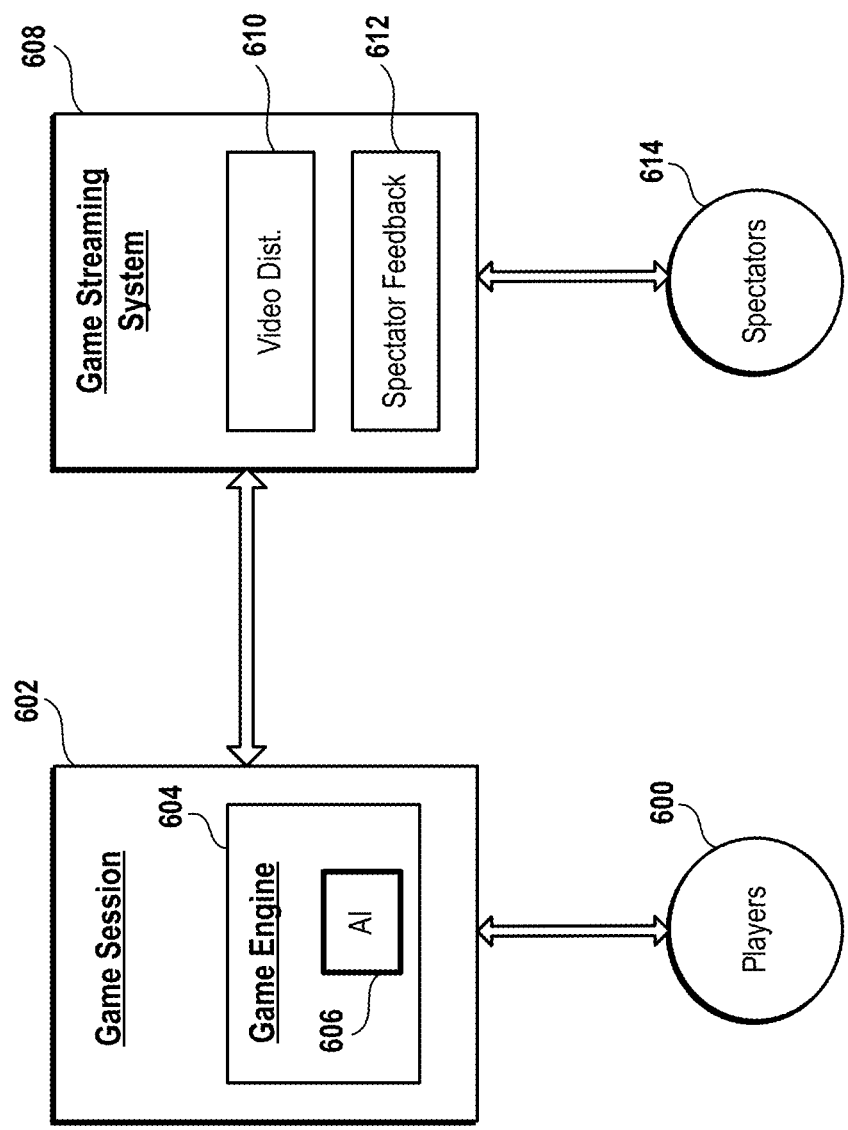
FIG. 6 conceptually illustrates spectator feedback being applied to adjust gameplay of a video game, in accordance with implementations of the disclosure.

FIG. 6 conceptually illustrates spectator feedback being applied to adjust gameplay of a video game, in accordance with implementations of the disclosure. In the illustrated implementation, a player 600 engages in gameplay of a video game. The player's game session 602 is further defined by execution of a game engine 604. As the game engine 604 continually updates the game state of the game session, the game engine 604 renders video frames of gameplay video which are viewed by the player 600. The gameplay video can be distributed by a video distribution module 610 of a game streaming system 608, to enable spectators 614 to spectate the player's gameplay.

The game streaming system 608 further includes a spectator feedback module 612 that is configured to enable and process feedback mechanisms for the spectators 614. Examples of feedback mechanisms can include comments (e.g. text comments) as well as visual or audio input from the spectators 614, biometric feedback from the spectators, related activity such as social network sharing, etc. Spectator feedback can also be determined by tracking increases or decreases in the number of spectators of the game session 602. Such indicators of spectator feedback can be processed by the spectator feedback module 612 to determine the current engagement level or sentiment or emotional state of the spectators. In some implementations, messages or notifications regarding the engagement of the spectators can be displayed or otherwise provided to the player 600 as feedback.

Furthermore, in some implementations, the spectator feedback can be used to drive changes in the execution of the video game. For example, if it is detected that spectator engagement is low or decreasing, then the game streaming system 608 may trigger the game engine 604 to adjust its execution or game state so as to increase the interest level of the gameplay or make it more exciting. For example, in some implementations, the game engine AI 606 can be adjusted to, for example, spawn more enemies, or otherwise increase activity which would make the gameplay more interesting. In this manner, spectator feedback is used to drive changes to the game environment, such as changing the game engine AI to produce more activity or less activity based on spectator feedback and attitudes.

In some implementations, other actions can be taken to engage spectators during periods of low spectator interest. For example, when it is detected that spectator engagement is low and/or gameplay activity is low, then the game streaming system 608 can introduce other items of interest, such as showing an advertisement or providing statistics about the current game session. In this manner, periods of otherwise low interest are utilized to insert additional information which may be of interest to spectators and prevent them from getting bored.

Broadly speaking, implementations of the present disclosure have been described in which spectators spectate a player's gameplay of a video game over a network. However, in other implementations, methods and systems of the present disclosure are applied in the context of e-sports which are spectated by spectators in a common space such as an arena or stadium, and optionally using common displays. Mechanisms can be implemented in such settings to enable spectators to be identified and provide feedback, such as in the form of comments or audio or video, etc. And using information about the spectators, feedback to a player can be provided that is configured to assist the player in growing their popularity with the spectators.

Implementations of the present disclosure can be included as part of a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("IOPS"). Thus, a gaming provider may specify VMs, dedicated processing power, amount of memory, etc.

from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 7A:
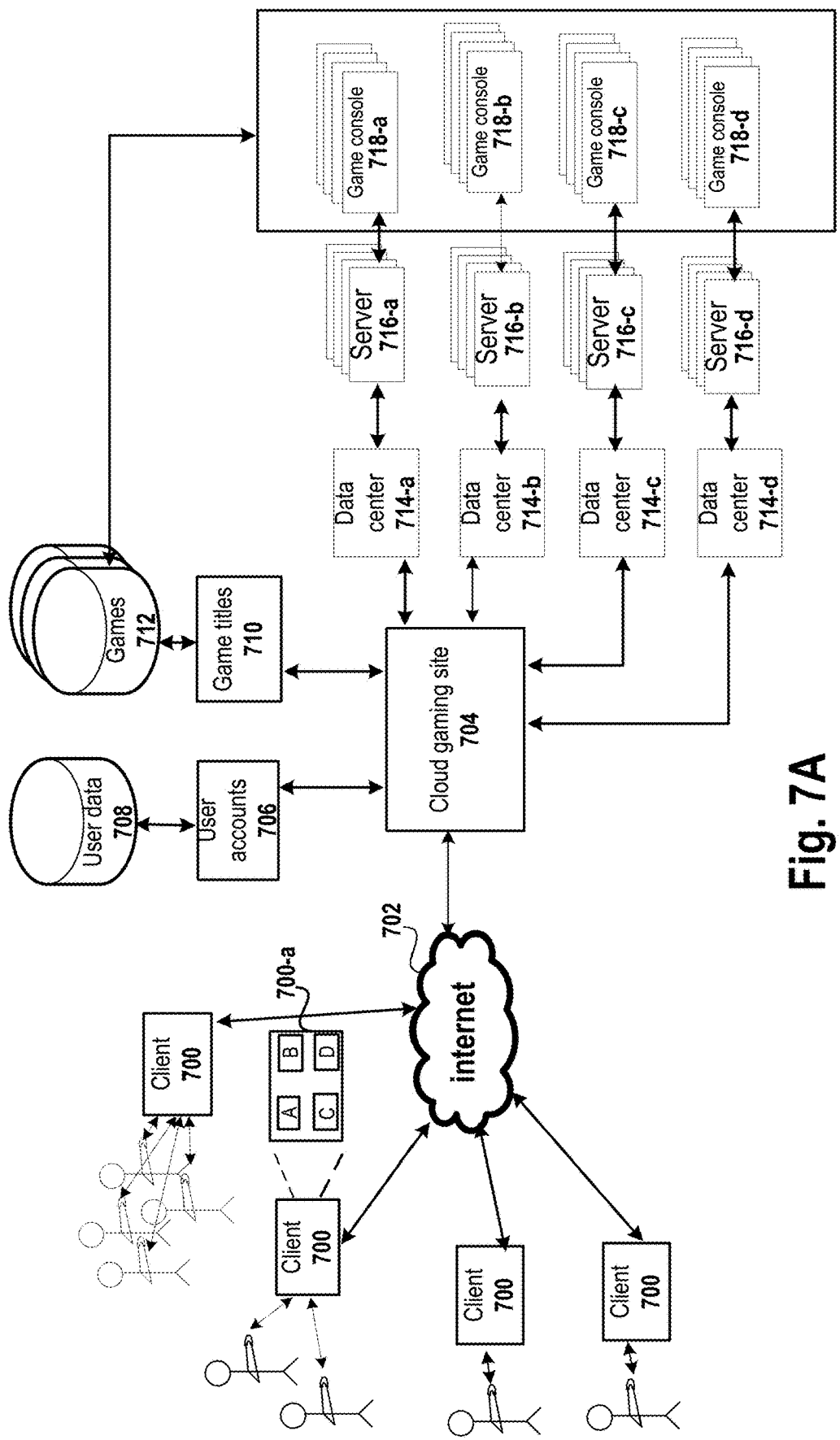
FIG. 7A illustrates an exemplary system used to load game files for a game available through a cloud gaming site, in accordance with implementations of the disclosure.

FIG. 7A illustrates an exemplary system used to load game files for a game available through a cloud gaming site. The system includes a plurality of client devices 700 that are communicatively connected to the cloud gaming site 704 over a network 702, which can include a LAN, wired, wireless, cellular (e.g. 4G, 5G, etc.), or any other type of data network, including the Internet. When a request to access the cloud gaming site 704 is received from a client device 700, the cloud gaming site 704 accesses user account information 706 stored in a user data store 708 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 710 to identify the game titles that are available at the game cloud site for the user account initiating the request. The game titles data store 710, in turn, interacts with a games database 712 to obtain the game titles for all the games that are available for the cloud gaming site. As new games are introduced, the games database 712 will be updated with the game code and the game titles data store 710 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 700-*a*, as shown in FIG. 7A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive.

Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 7B:
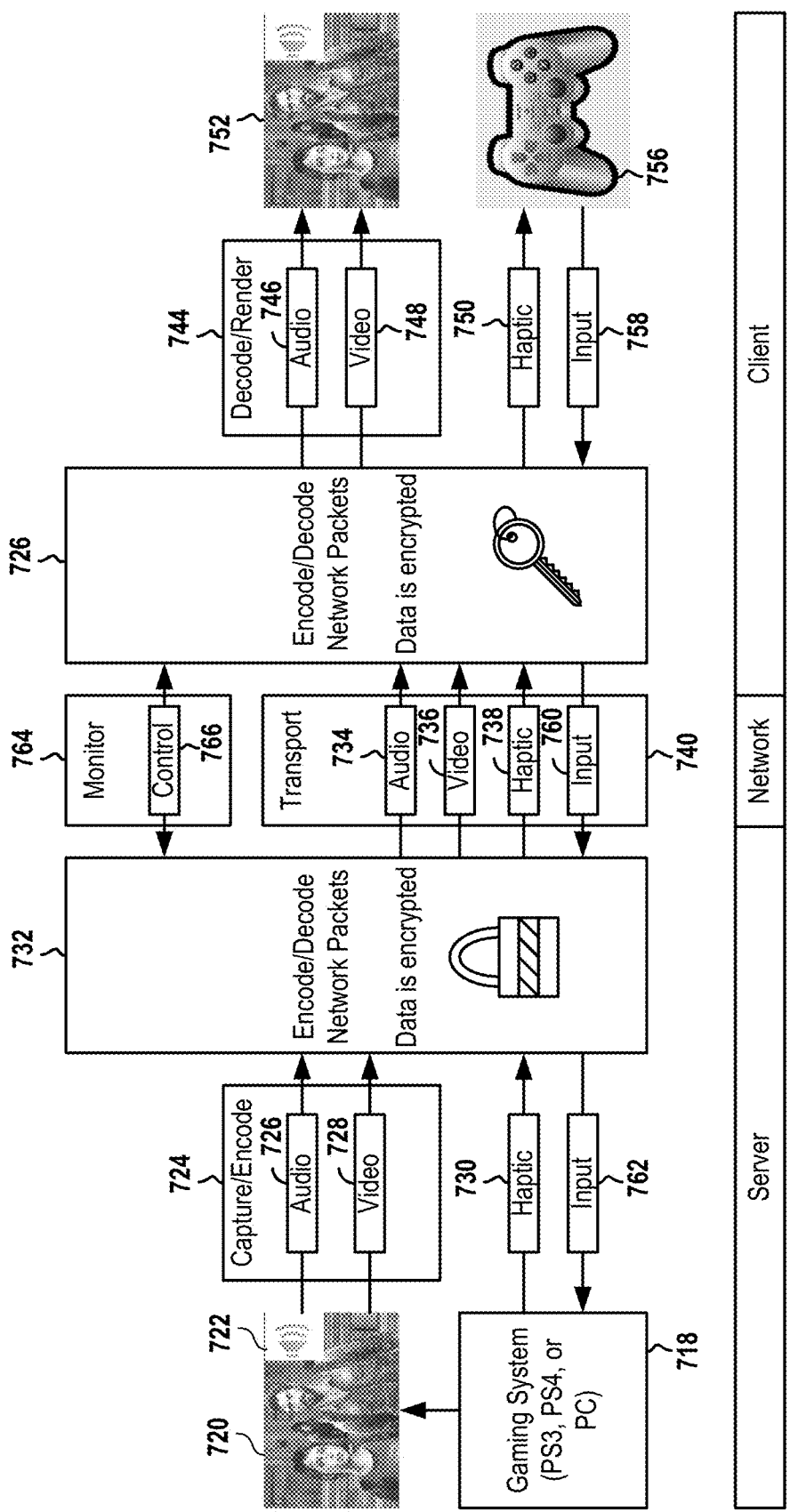
FIG. 7B is a flow diagram conceptually illustrating various operations which are performed for streaming a cloud video game to a client device, in accordance with implementations of the disclosure.

FIG. 7B is a flow diagram conceptually illustrating various operations which are performed for streaming a cloud video game to a client device, in accordance with implementations of the disclosure. The gaming system 718 executes a video game and generates raw (uncompressed) video 720 and audio 722. The video 720 and audio 722 are captured and encoded for streaming purposes, as indicated at reference 724 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 726 and encoded video 728 are further packetized into network packets, as indicated at reference numeral 732, for purposes of transmission over a network such as the Internet. The network packet encoding process can also employ a data encryption process, thereby providing enhanced data security. In the illustrated implementation, audio packets 734 and video packets 736 are generated for transport over the network, as indicated at reference 740.

The gaming system 718 additionally generates haptic feedback data 730, which is also packetized into network packets for network transmission. In the illustrated implementation, haptic feedback packets 738 are generated for transport over the network, as further indicated at reference 740.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 740, the audio, video, and haptic feedback packets are transported over a network, such as and/or including the Internet. As indicated at reference 742, the audio packets 734, video packets 736, and haptic feedback packets 738, are decoded/reassembled by the client device to define encoded audio 746, encoded video 748, and haptic feedback data 750 at the client device. If the data has been encrypted, then the network packets are also decrypted. The encoded audio 746 and encoded video 748 are then decoded by the client device, as indicated at reference 744, to generate client-side raw audio and video data for rendering on a display device 752. The haptic feedback data 750 can be processed/communicated to produce a haptic feedback effect at a controller device 756 or other interface device through which haptic effects can be rendered. One example of a haptic effect is a vibration or rumble of the controller device 756.

It will be appreciated that a video game is responsive to user inputs, and thus, a similar procedural flow to that described above for transmission and processing of user input, but in the reverse direction from client device to server, can be performed. As shown, a user operating controller device 756 may generate input data 758. This input data 758 is packetized at the client device for transport over the network to the cloud gaming system. The input data packets 760 are unpacked and reassembled by the cloud gaming server to define input data 762 on the server-side. The input data 762 is fed to the gaming system 718, which processes the input data 762 to update the game state of the video game.

During transport (ref. 740) of the audio packets 734, video packets 736, and haptic feedback packets 738, the transmission of data over the network can be monitored to ensure the cloud game stream quality of service. For example, network conditions can be monitored as indicated by reference 764, including both upstream and downstream network bandwidth, and the game streaming can be adjusted in response to changes in available bandwidth. That is, the encoding and decoding of network packets can be controlled based on present network conditions, as indicated by reference 766.

Figure 8:
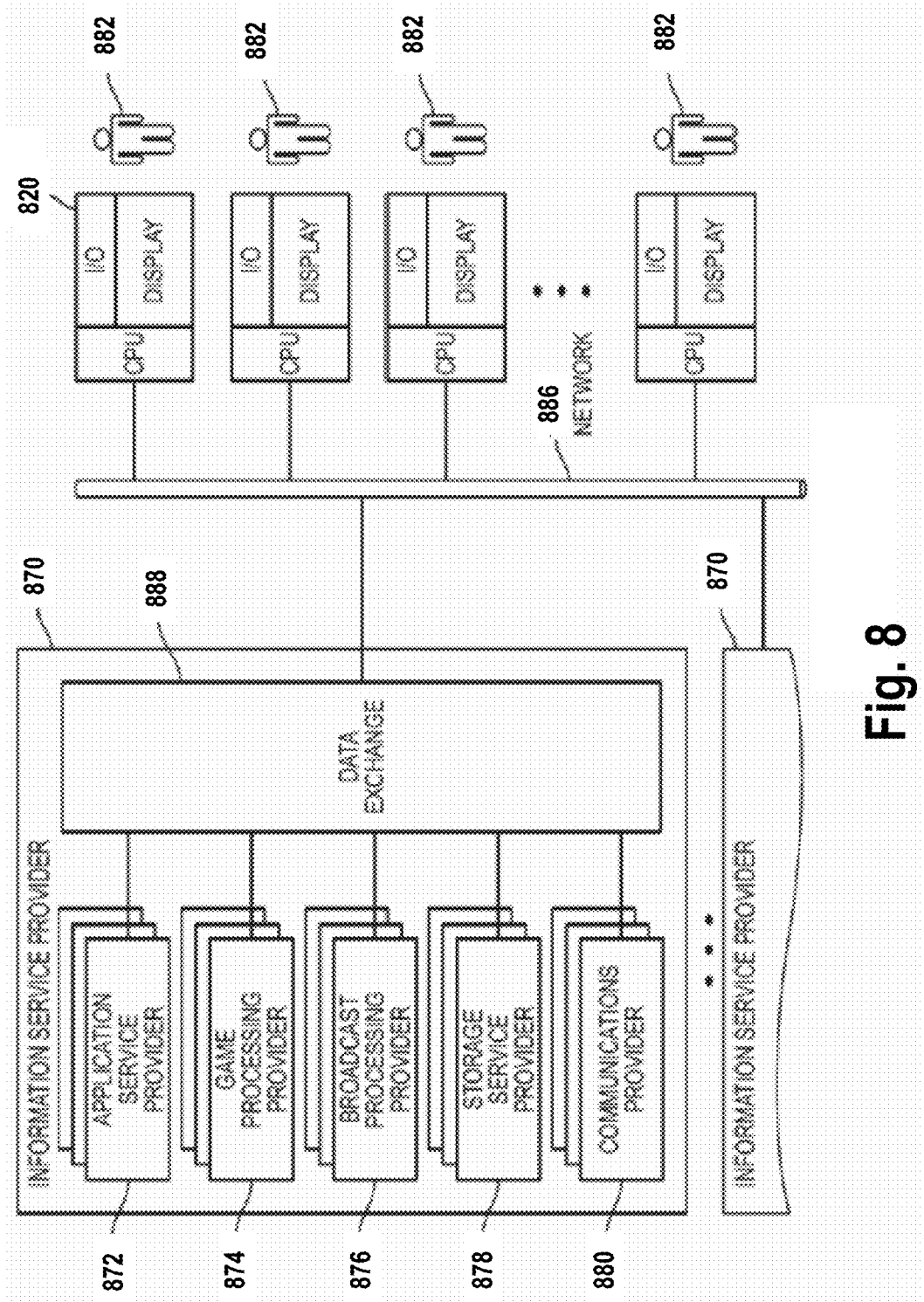
FIG. 8 illustrates an embodiment of an Information Service Provider architecture, in accordance with implementations of the disclosure.

FIG. 8 illustrates an embodiment of an Information Service Provider architecture. Information Service Providers (ISP) 870 delivers a multitude of information services to users 882 geographically dispersed and connected via network 886. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 870 includes Application Service Provider (ASP) 872, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 870 includes a Game Processing Server (GPS) 874 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 876 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 878 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 880 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 888 interconnects the several modules inside ISP 870 and connects these modules to users 882 via network 886. Data Exchange 888 can cover a small area where all the modules of ISP 870 are in close proximity, or can cover a large geographic area when the different modules are geographically dispersed. For example, Data Exchange 888 can include a fast Gigabit Ethernet (or faster) within a cabinet of a data center, or an intercontinental virtual area network (VLAN).

Users 882 access the remote services with client device 884, which includes at least a CPU, a memory, a display and I/O. The client device can be a PC, a mobile phone, a netbook, tablet, gaming system, a PDA, etc. In one embodiment, ISP 870 recognizes the type of device used by the client and adjusts the communication method employed. In other cases, client devices use a standard communications method, such as html, to access ISP 870.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method, comprising:
analyzing gameplay data and spectator data from previous sessions of a video game, wherein the spectator data is generated from spectator interactivity with gameplay video of the previous sessions that is streamed over a network to enable the spectator interactivity, wherein the analyzing is configured to correlate a spectator preference to a gameplay condition of the video game;
using the correlated spectator preference to generate an in-game recommendation for the gameplay condition;
identifying the gameplay condition occurring in a current session of the video game, wherein said identifying includes analyzing game state data as said game state data is continually generated by the current session of the video game;
responsive to identifying the gameplay condition occurring in the current session, then presenting the in-game recommendation to a player of the current session of the video game, wherein presenting the in-game recommendation includes display of a message in a player view that is rendered for the player of the current session.

2. The method of claim 1, wherein correlating the spectator preference to the gameplay condition is configured to identify a player activity that increases or maximizes a number of spectators during the gameplay condition in the previous sessions, and wherein the in-game recommendation is configured to recommend to the player of the current session to perform the player activity that increases or maximizes the number of spectators during the gameplay condition in the previous sessions, so as to increase a likelihood of increasing spectators for the player or the current session.

3. The method of claim 1, wherein correlating the spectator preference to the gameplay condition is configured to identify a player activity that increases or maximizes spectator engagement during the gameplay condition in the previous sessions, and wherein the in-game recommendation is configured to recommend to the player of the current session to perform the player activity that increases or maximizes spectator engagement during the gameplay condition in the previous sessions, so as to increase a likelihood of increasing spectator engagement for the player or the current session.

4. The method of claim 3, wherein spectator engagement is defined from one or more of comments, likes, shares, subscribes, spending, sponsorships.

5. The method of claim 1, wherein the gameplay condition of the video game is defined by one or more of a time of day, a location in a virtual environment of the video game, a level or stage of the video game.

6. The method of claim 1, wherein the gameplay data includes one or more of gameplay event data, player inputs, player location data.

7. The method of claim 1, wherein the spectator data includes one or more of numbers of spectators, comments, spectator profile data.

8. A non-transitory computer readable medium having program instructions embodied thereon that, when executed by at least one computing device, cause said at least one computing device to perform a method comprising the following method operations:
analyzing gameplay data and spectator data from previous sessions of a video game, wherein the spectator data is generated from spectator interactivity with gameplay video of the previous sessions that is streamed over a network to enable the spectator interactivity, wherein the analyzing is configured to correlate a spectator preference to a gameplay condition of the video game;
using the correlated spectator preference to generate an in-game recommendation for the gameplay condition;
identifying the gameplay condition occurring in a current session of the video game, wherein said identifying includes analyzing game state data as said game state data is continually generated by the current session of the video game;
responsive to identifying the gameplay condition occurring in the current session, then presenting the in-game recommendation to a player of the current session of the video game, wherein presenting the in-game recommendation includes display of a message in a player view that is rendered for the player of the current session.

9. The non-transitory computer readable medium of claim 8, wherein correlating the spectator preference to the gameplay condition is configured to identify a player activity that increases or maximizes a number of spectators during the gameplay condition in the previous sessions, and wherein the in-game recommendation is configured to recommend to the player of the current session to perform the player activity that increases or maximizes the number of spectators during the gameplay condition in the previous sessions, so as to increase a likelihood of increasing spectators for the player or the current session.

10. The non-transitory computer readable medium of claim 8, wherein correlating the spectator preference to the gameplay condition is configured to identify a player activity that increases or maximizes spectator engagement during the gameplay condition in the previous sessions, and wherein the in-game recommendation is configured to recommend to the player of the current session to perform the player activity that increases or maximizes spectator engagement during the gameplay condition in the previous sessions, so as to increase a likelihood of increasing spectator engagement for the player or the current session.

11. The non-transitory computer readable medium of claim 10, wherein spectator engagement is defined from one or more of comments, likes, shares, subscribes, spending, sponsorships.

12. The non-transitory computer readable medium of claim 8, wherein the gameplay condition of the video game is defined by one or more of a time of day, a location in a virtual environment of the video game, a level or stage of the video game.

13. The non-transitory computer readable medium of claim 8, wherein the gameplay data includes one or more of gameplay event data, player inputs, player location data.

14. The non-transitory computer readable medium of claim 8, wherein the spectator data includes one or more of numbers of spectators, comments, spectator profile data.

* * * * *